United States Patent
Zimmer et al.

(10) Patent No.: US 6,827,799 B2
(45) Date of Patent: Dec. 7, 2004

(54) METHOD OF PRODUCING WEAKENED ZONES IN SHAPED PLASTIC PARTS BY MEANS OF ULTRA SOUND CUTTING

(75) Inventors: Wolfgang Zimmer, Riegel (DE); Antonio Vidal Garrido, Barcelona (ES)

(73) Assignee: Peguform GmbH & Co. KG, Botzingen (DE)

( * ) Notice: Subject to any disclaimer, the term of this patent is extended or adjusted under 35 U.S.C. 154(b) by 0 days.

(21) Appl. No.: 10/724,437

(22) Filed: Nov. 28, 2003

(65) Prior Publication Data

US 2004/0129367 A1 Jul. 8, 2004

(30) Foreign Application Priority Data

Nov. 29, 2002 (DE) .......................................... 102 56 151

(51) Int. Cl.[7] .............................................. B32B 31/18
(52) U.S. Cl. ..................................... 156/73.3; 156/73.1
(58) Field of Search .............................. 156/73.1, 73.3, 156/250, 256, 257, 580.1, 580.2

(56) References Cited

U.S. PATENT DOCUMENTS

| | | | |
|---|---|---|---|
| 5,779,262 A | 7/1998 | Totani et al. | |
| 5,865,461 A | 2/1999 | Totani et al. | |
| 6,065,771 A | 5/2000 | Kawabuko et al. | |
| 6,109,645 A | 8/2000 | Totani et al. | |
| 6,239,046 B1 | 5/2001 | Veiga et al. | |
| 6,254,707 B1 * | 7/2001 | Sfikas et al. | ................ 156/73.3 |
| 6,354,623 B1 | 3/2002 | Delmastro | |
| 6,402,189 B1 | 6/2002 | Gray et al. | |
| 6,440,051 B1 | 8/2002 | Lauzon | |
| 6,440,514 B1 | 8/2002 | Ueno et al. | |
| 2001/0045728 A1 | 11/2001 | Kansteiner et al. | |

FOREIGN PATENT DOCUMENTS

| | | |
|---|---|---|
| DE | 44 09 405 | 9/1994 |
| EP | 0 711 627 | 5/1996 |

* cited by examiner

*Primary Examiner*—James Sells
(74) *Attorney, Agent, or Firm*—Henry M. Feiereisen; Ursula B. Day

(57) ABSTRACT

A method is disclosed wherein weakened zones are provided in plastic trim parts in the from of cuts produced by means of an ultra sound cutting method, and wherein the cuts can be made suitably narrow and extending through the thickness of a multilayered plastic trim part in a manner that the cuts are without jagged edges and remain invisible on the visible side even when the cut extends though a decorative layer of the multilayered plastic part even after long term storage under heat.

9 Claims, 5 Drawing Sheets

METHOD OF PRODUCING WEAKENED ZONES IN SHAPED PLASTIC PARTS BY MEANS OF ULTRA SOUND CUTTING

CROSS-REFERENCES TO RELATED APPLICATIONS

This application claims the priority of German Patent Application Serial No. 102 56 151.6, filed Nov. 29, 2002, pursuant to 35 U.S.C. 119(a)–(d), the subject matter of which is incorporated herein by reference.

BACKGROUND OF THE INVENTION

The present invention relates a method to produce weakened zones by means of an ultra sound cutting process and in particular to a method for produce weakened zones in plastic trim parts by means of an ultra sound cutting method.

Plastic trim parts which are provided with weakened zones or designated breaking lines are frequently used as panels covering the interior of cars and automobiles. They are for example also used as optical covers for security systems, such as in devices for airbags in an automobile. Such weakened zones should be advantageously provided in the plastic trim parts so that they are invisible and remain stable over the course of a long time, up to many years. These weakened zones can be grooves cut into the plastic trim parts by various methods.

From the prior art, the use of ultra sound for producing such grooves in plastic trim parts is known for example from U.S. Pat. No. 6,440,051 where a method of using an ultra sound welding apparatus is disclosed. This method is used to produce perforations in trim parts by means of a continuous process. However, the process does not produce grooves of weakened zones in the plastic trim part, but is limited to a perforation of the series of strata (12) and the perforations are not invisible. A decorative layer (12) as well as a foam layer (14) are perforated, but not the layer (15) designated as the barrier layer (15). These perforations are needed for decorative purposes only, since they are applied on the visible side of the interior paneling.

In addition to the above described perforations, weakened zones which are configured as designated breaking lines are provided. These weakened zones extend through the base layer and partially into the series of layers (12). The weakened zones are applied by means of an ultra sound welding apparatus, by means of a heated or non-heated cutting knife or a high frequency cutting device. However, with this method only V-shaped cuts as shown in FIG. 3 can be realized. However, such a V-shaped cut can be of advantage only if the displaced material from the cutting operation can be securely removed through the cutting motion.

Furthermore, producing weakened zones in expanded polypropylene (EPP) are known from U.S. patent publication No. 2001/0045728A1. The weakened zones there are also provided in the form of V-shaped grooves. According to this teaching, the V-shaped weakened zone is configured as a recess and not as a groove. It is particularly emphasized that the V-shaped weakened zone is produced by a pressure process. By means of the pressure process a higher density is allegedly realized in the area of the V-shaped weakened zone than in the unweakened zone of the trim part in order to provide local stability to the weakened zone. However, in this prior art patent the ripping seam of an airbag seam is not invisible at the side which is visible to the passenger, i.e. the viewing side, nor that it is a desired property to be retained for many years of the vehicle's use. Also, the V-shaped configuration of the cutting profile renders it visible on the viewing side of the plastic trim part, which is undesirable and is detected in heat storage tests.

EP 0711627 shows the configuration of a cut (e.g. FIGS. 9–12) relating to perforations which are produced by means of laser cutting methods. According to this prior art reference, wider cuts are considered advantageous especially when cuts are configured in a line since these cuts are subsequently designed to be filled with material and thus the cut configurations are not designed for narrow cuts with a size of width of up to 1 mm.

Furthermore, use of a cutting means operated with ultrasound is disclosed in DE 44 09 405. However, the ultra sound cutting is applied to a series of layers of polyurethane foam and a plastic carrier. It has been found that especially for these material combinations the method described in the reference is less advantageous than a laser cutting method also disclosed there. The laser energy causes the plastic section to evaporate thereby eliminates the problem of the discharged material. A solution to the problem of the discharge or cut-away material using ultra sound is not disclosed.

Accordingly, none of the afore-described prior art provides a solution for producing a permanent and invisible tear seam for example for an airbag or another type of plastic part using weakened zone in a multilayered plastic trim part, where it is required that the weakened zones extend through the carrier-, barrier- and foam layers into the decorative layer.

The methods for producing invisible air bag tear seams currently used, such as milling, laser cutting, or laser perforation, when used with expanded poly-propylene (EPP), result in additional problems when carrying out the cuts due to bonding of the cut material which thus ends up in an unsmooth cutting profile. It is therefore also virtually impossible not to end up with essentially a V-shaped cutting profile.

As series of tests have demonstrated, the known prior art does not provide the basis for solving the drawbacks and shortcomings as discussed here since neither milling nor laser cutting or laser perforation have provided the desired results, since the discharge of material from the cutting site is only possible when the configuration of the cut essentially approximates a V-shape.

It would therefore be desirable and advantageous to provide an improved method to provide invisible weakened zones in plastic trim parts and to obviate prior art shortcomings by providing the plastic trim parts with weakened zones which remain invisible even after a long period of time, such as several years and even under changing temperature conditions.

SUMMARY OF THE INVENTION

According to one aspect of the invention, a weakened zone is produced in plastic parts in the form of a cut of very small width, and consequently prevent that discharged material from the cutting action accumulates so that it is visible at a visible side of a multilayered plastic part.

According to another aspect of the present invention, a method for producing weakened zones in a plastic trim part is provided, wherein the plastic trim part has a carrier layer and a decorative layer, including the steps of inserting the decorative layer into a foaming tool and coating the decorative layer with a foam layer, whereby the decorative layer is attached to a carrier layer of expanded poly propylene or between the decorative layer and the carrier layer a foam layer extends and each of the carrier layer and the foam layer are having a depth dimension, subsequently bringing an ultra sound cutting device in contact with the carrier layer and the foam layer thereby cutting into the carrier layer and the foam layer and producing a cut through the carrier layer and the foam layer and extending along a longitudinal extension with a width of up to 1 mm.

The present invention resolves prior art problems by providing a method of cutting, wherein the amount of discharged material is so small that the cut is no longer required to be in a V-shape.

Thus, if the cut has a cross section of such a small size that it can hardly be detected by plain eye sight, the material discharge is thereby not only reduced to a minimum, but the cut itself hardly weakens the plastic material even if forces are applied which are generated under normal use of the plastic trim part. These forces are at least partially applied in a direction normal to the cutting plane, whereby the cut either closes by itself or behaves in same manner as its surrounding area or, the cut only widens slightly. Thereby, no large forces are impacting the decorative layer. However, should the airbag release the forces impacting the cut be directed in a direction parallel to the cutting surface, the remaining part of the unweakened cross section can be cleanly severed, without the formation of break-down material.

With the method according to the present invention of producing weakened zones in plastic parts, it is possible to produce weakened zones in plastic parts utilized for example for the interior of a vehicle, wherein the weakened zones which will not be visible on the visible side and which can be retained in that condition for several years.

Since the ultra sound cut does not damage the material of the carrier layer when the carrier layer is made from a special material such as for example polypropylene, neither bonding nor formation of any residue or unsmooth surfaces on the cutting surface are the consequence. Thus, the ultra sound cutting process permits the production of very smooth cutting surfaces.

Since the residue material in the cutting profile is thus eliminated, very precise cuts can be realized. These cuts can be of any depth so that in an advantageous embodiment not only the carrier layer but also the foam layer and parts of the decorative layer can be cut. These cuts can also be produced within any time frame after the manufacturing of the plastic part. As a result, there is no need for coupling the manufacture of the plastic part with the cutting apparatus but can be separately carried out by separate installations in different locations. This allows the separate processing steps to be carried out for example at the time when the plastic part is mounted into a vehicle.

BRIEF DESCRIPTION OF THE DRAWING

Other features and advantages of the present invention will be more readily apparent upon reading the following description of currently preferred exemplified embodiments of the invention with reference to the accompanying drawings, in which.

DETAILED DESCRIPTION OF PREFERRED EMBODIMENTS

Figure 1:
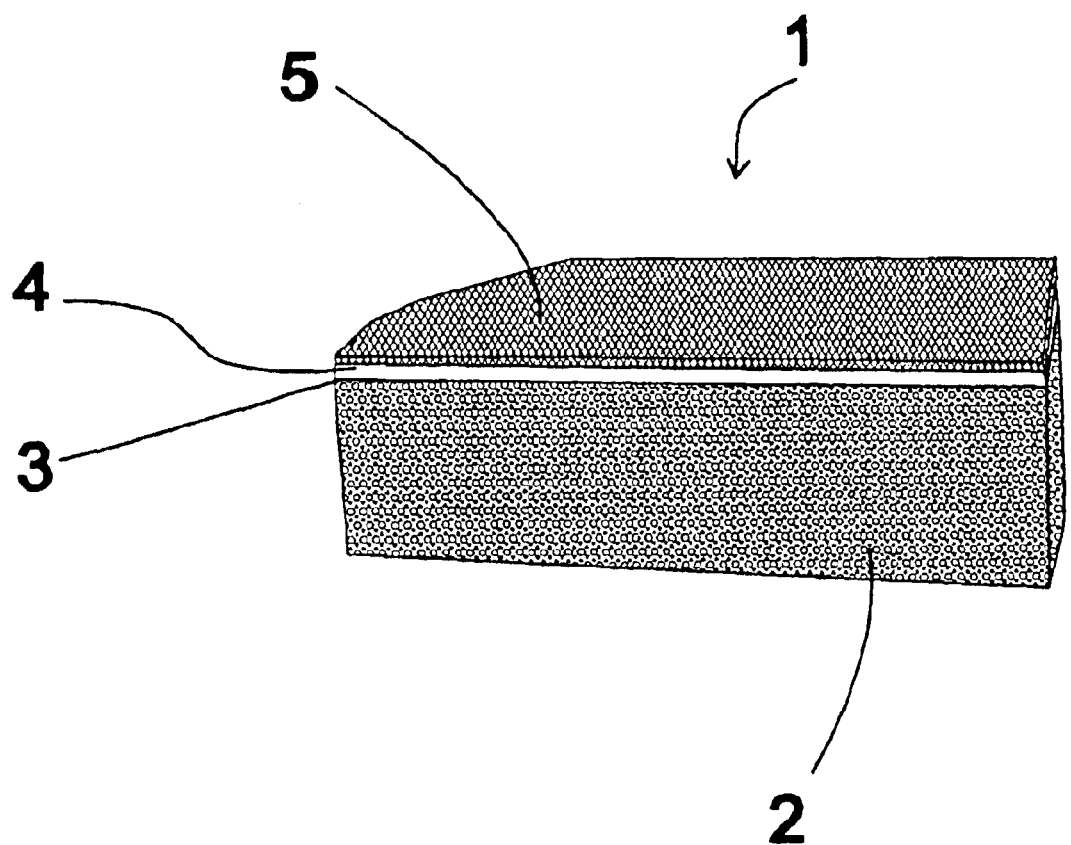
FIG. 1 is a front view of a multilayered EPP plastic part according to the present invention.

Throughout all the Figures, same or corresponding elements are generally indicated by same reference numerals.

Turning now to the drawing, and in particular to FIG. 1, there is shown an illustration of a multilayered plastic part 1 with at least one layer 2 from EPP (expanded poly propylene). The EPP-layer 2 functions as the carrier layer. A subsequent barrier layer or connection layer 3, preferably from PA (polyamide) can be provided, which is followed by a foam layer 4, preferably from poly propylene or PVC foam (Poly Vinyl Chloride), which is followed by a decorative layer 5. This decorative layer 5 comprises TPO (Thermo Plastic Polyolefin), PVC or similar material.

Figure 2:
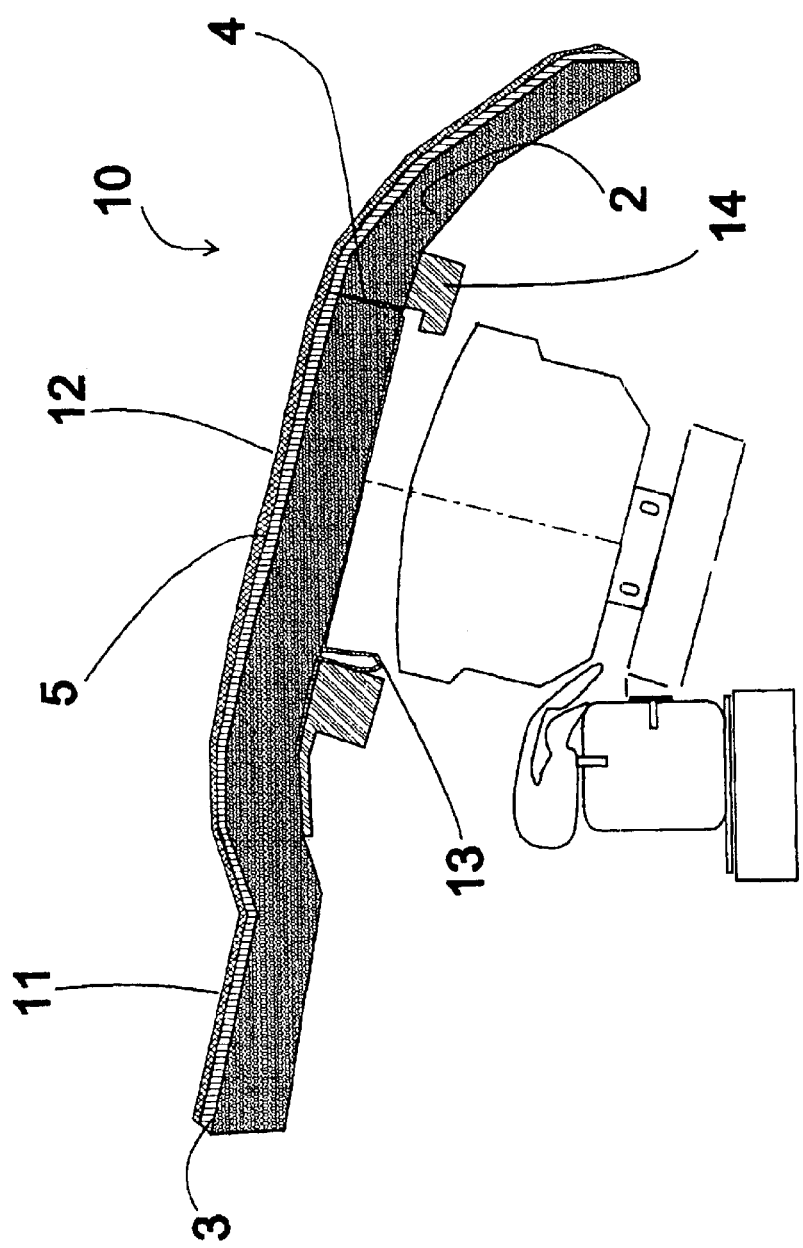
FIG. 2 is an example of the application of a multilayered plastic part in the instrument panel of a vehicle.

FIG. 2 illustrates an example of a possible use of such a plastic trim part. FIG. 2 shows a section through an airbag cover in a first embodiment. The interior space paneling 10 comprises an area which functions as a cover 11 for the airbag and at least a further area 12 which functions as cover of the vehicle's interior space relative to the carrier or frame construction of the vehicle. In a preferred embodiment, the interior paneling comprises a decorative layer 5 and a plastic carrier layer 2. The plastic carrier layer 2 is preferably from EPP, when a primary object is to reduce the weight of the plastic part. Such a foam layer 4 is preferably from Polypropylene or PVC.

In general, the foam layer 4 is covered by a decorative layer 5. In case expanded polypropylene (EPP) is used as a carrier layer 2, a relatively large cellular space is formed, the adherence of which to the foam layer 4 is insufficient depending on the material used in order to realize a durable bond of the EPP layer and the foam layer 4. Therefore, the EPP layer 2 can be covered by a further barrier- or connection layer 3 which functions either as a bonding agent or as a bonding layer.

The foam layer 4 is preferably likewise from foamed PP but can also be from other materials such as polyethylene (PE) or PVC. This foam layer 4 which is also designated as a back layer is placed together with the decorative layer 5 such as for example a foil, into the foam tool and foamed with EPP to form a backing.

Figure 3:
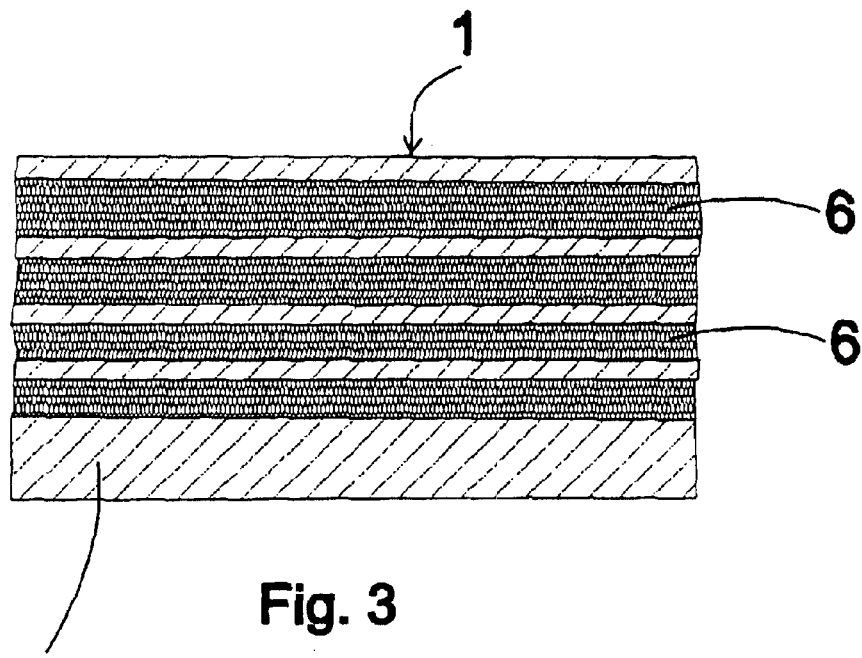
FIG. 3 and FIG. 4 illustrate weakened zones which were produced by a milling apparatus.

FIG. 3 illustrates a weakening of an EPP layer 2 through milling. The view as shown in FIG. 3 is a view from the side which carries the weakened zone. When using a milling process unit having different diameter, different widths of grooves 6 can be produced. However, in studies, it has been shown that these grooves have an unsmooth surface. In the area of the EPP layer projections extend into the grooves and are forming jagged edges 7. However, the formation of such jagged edges should be prevented, since upon release of the airbag, splintering particles from the jagged edges will separate from the carrier layer thereby causing uncontrolled dispatch of these within the interior of the car.

During milling, the width dimension of the grooves 6 can pose a problem, wherein the outline of the grooves 6 can become visible as a contour on the surface of the decorative layer. Such outlines are generally not suitable for invisible airbag devices.

Figure 4:
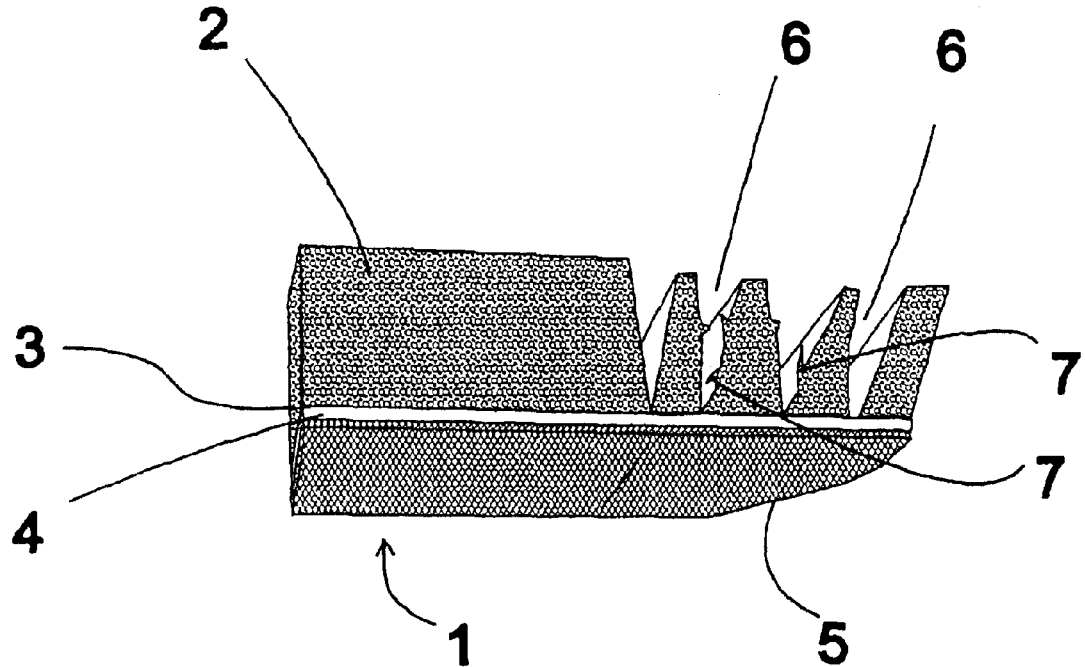

FIG. 4 shows a perspective view of a weakened zone produced through milling of a multilayered EPP form part. The locations of jagged edges are depicted schematically.

Figure 5:
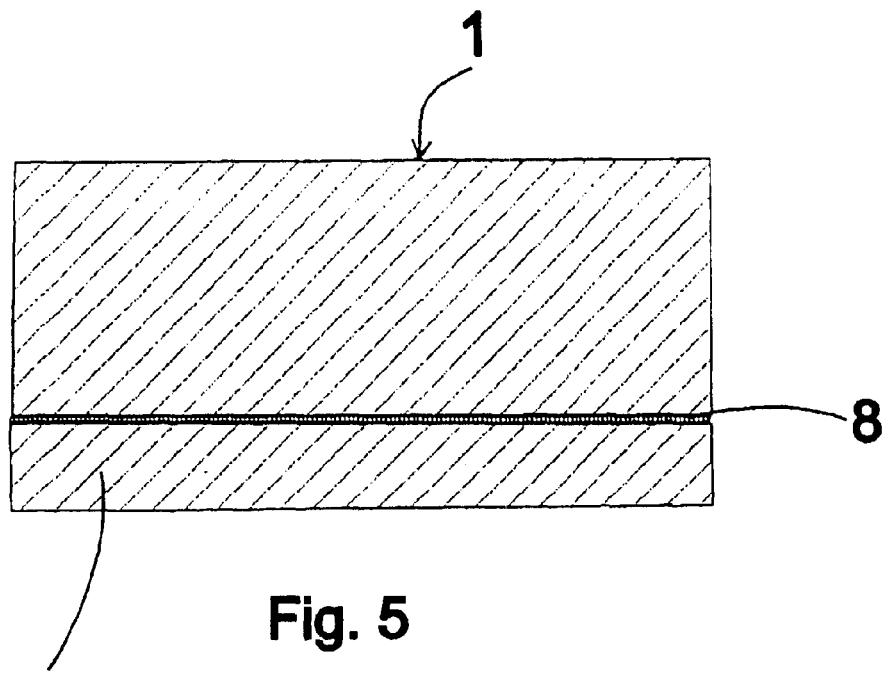
FIG. 5 and FIG. 6 illustrate weakened zones, which were produced by means of a laser perforation apparatus.

FIG. 5 is a top view of a groove produced by laser perforation. Laser perforation has distinct advantages as compared to milling relative to the width of the groove 8, however, not in all cases is the width small enough to prevent in each case that the groove 8 becomes visible. The optical properties of the material have a significant effect on the quality of the groove, and certain materials are not suitable for this treatment.

Figure 6:
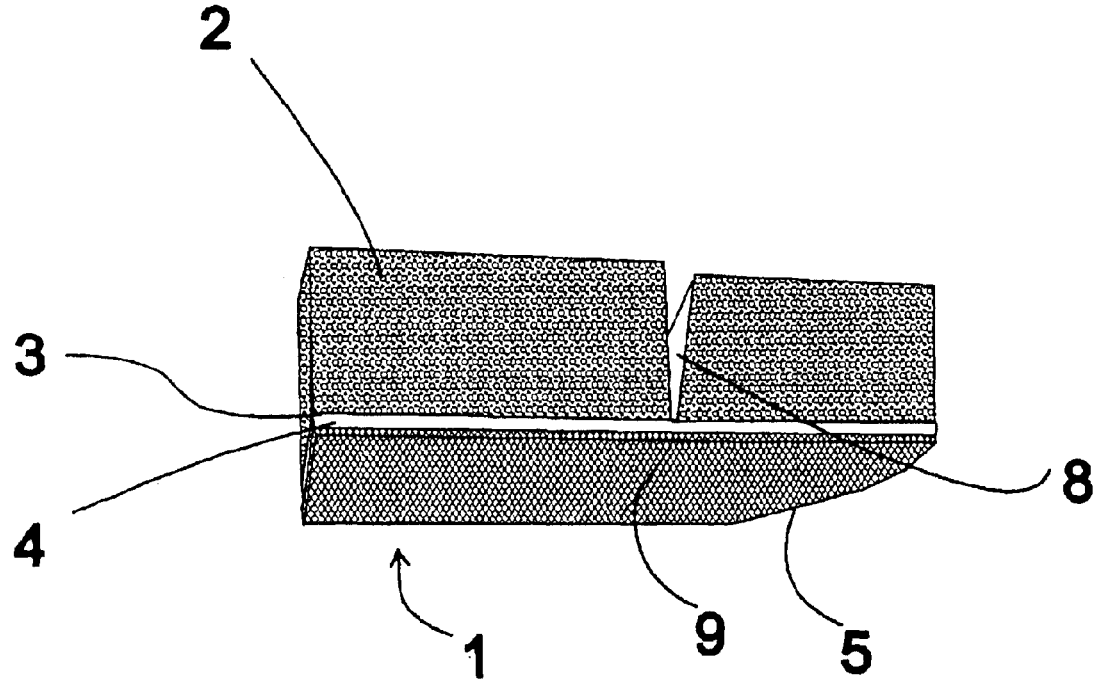

In tests done so far, producing a plastic part from EPP with a groove which does not become visible on the visible side after a certain period of storage time, under influence of temperature, has not been successful. Break-in sites 9 which extend along the groove 8 on the viewing side of the plastic form part remain always irreversible if the grooves 8 comprise not only the carrier layer 2 but also the foam layer 3 and parts of the decorative layer 5. FIG. 6 illustrates such a groove 8 produced by means of laser perforation.

Figure 7:
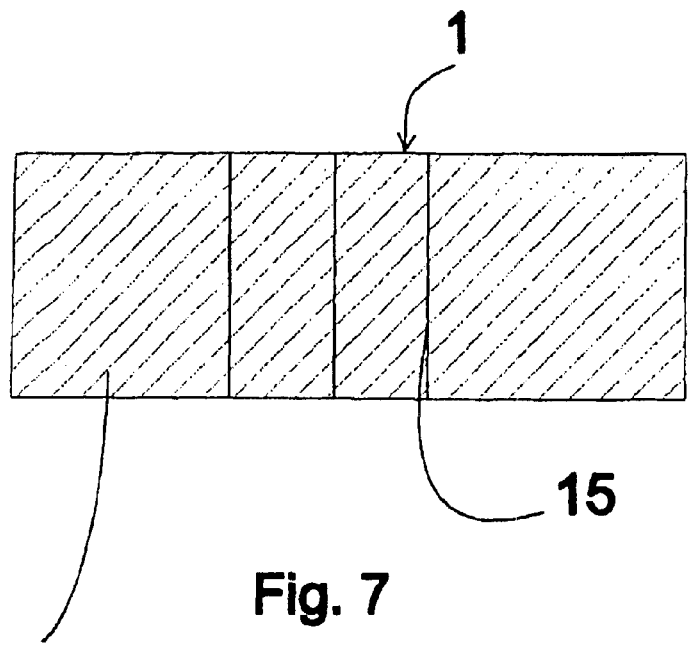
FIG. 7 and FIG. 8 illustrate weakened zones produced by means of an ultrasound cutting apparatus.

FIG. 7 shows a front view of a groove 8 produced by means of ultra sound cutting. Ultra sound cutting not only minimizes the width of the ultra sound cut 15, but the production of cuts of all widths can be realized. Even when using different material combinations, there are significant advantages with respect to precision of guiding the cut, as well as the repeated exactness of the cutting depth. Only by application of these measures it can be completely avoided that the groove becomes visible.

In tests, it has been shown that the plastic trim part from EPP can be produced with a cut 15 which will not be invisible on the viewing side even when stored under high temperature conditions. No break-in sites remain that would extend along the cut 15 at the viewing side of the plastic form part, even when cut 15 comprises not only the carrier layer 2 but also the foam layer 3 and parts of the decorative layer 5.

Figure 8:
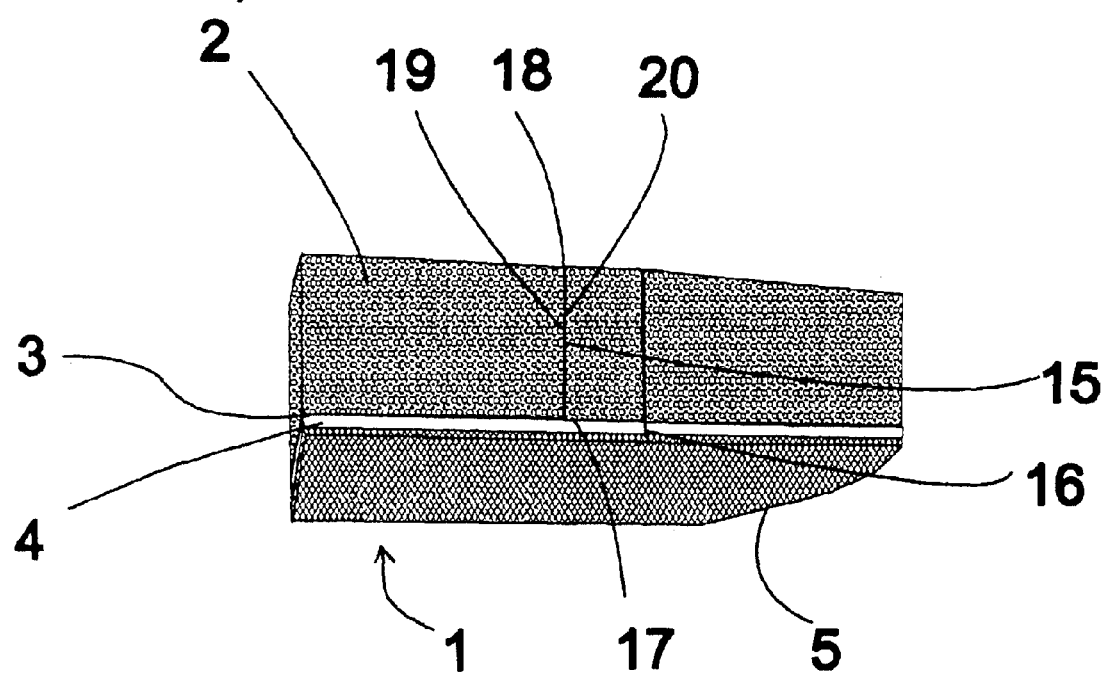

FIG. 8 shows two possible cuts 15, 16. The two cuts 15, 16 have a width of not more than 1 mm extending along the entire depth of the cut. The cuts can extend across the entire length dimension or width dimension of the plastic trim part or can be applied to only a portion of the plastic trim part. The cut can also be realized along less than the entire extension thereof and can be produced in interrupted sections, to thereby cut the plastic trim part only partially along the entire length of cut 15.

The width of the cut at the bottom of the cut 17 does not vary substantially as compared to the width of the cut at the cut surface 18 of one of the at least partially cut layers. Due to the left and right cutting surfaces 19, 20 nearly touching each other, in no event will knocking occur upon impacting of normal or approximately normal forces on the cutting surface. Forces impacting on the cutting surface which have a force component that is directed in a direction normal to the cutting plane, the two cutting surfaces are pressed together and by means of the friction between the surfaces such forces can be absorbed. This represents a definite advantage in plastic parts that are continually used for example in an automobile. Such plastic parts are subjected to different stresses originating for example through manipulation of the switches, opening of the glove compartment, the support of the door side covering. Such stresses have in common that they begin to impact in the two-dimensional plane and thus represent always a force component effective in a direction normal to the cutting surface.

If an airbag is released as part of a security component, the main direction of force impact is directed parallel to the cutting plane. Thus, in case of a security device activation, the force component which opposes the cutting of the remaining cross section must be overcome.

The depth of the cut can also be varied. Depending on the foam and decorative material used, the cut 15 can either extend only in the carrier material 2 or it can also partially extend into the foam layer 4. When using a decorative layer 5, which preferably is from TPO or PVC parts of the decorative layer can additionally be cut into. This cut 16 is shown in FIG. 8. When the depth of the cut in the foil does not exceed 75% of the foil thickness, then the cut remains invisible on the viewing side even after exposure to heat of the plastic trim part. In a front view of the cuts 15, 16 as-shown in FIG. 8, an ultra sound cut exhibits an approximately rectangular or rhomboidal cross section.

While the invention has been illustrated and described as embodied in plastic trim parts, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method of producing weakened zones in a plastic trim part, comprising providing the plastic trim part with a carrier layer and a decorative layer, by inserting the decorative layer into a foaming tool and coating the decorative layer with a foam layer, backing the decorative layer with a carrier layer of expanded poly propylene so that the decorative layer attaches to the carrier layer by means of the foam layer; each of said carrier layer and foam layer having a thickness dimension, subsequently bringing an ultra sound cutting device in contact with the carrier layer and the foam layer thereby cutting into the carrier layer and the foam layer and producing a cut with a width dimension of up to 1 mm through the entire thickness of the carrier layer and the foam layer and extending along a longitudinal extension thereof.

2. The method of claim 1, wherein the decorative layer is comprises thermoplastic polyolefin (TPO) or poly vinyl chloride (PVC).

3. The method of claim 1, wherein the foam layer comprises thermoplastic polyolefin (TPO) or poly vinyl chloride (PVC).

4. The method of claim 1, wherein the cut is made resulting in a cross section in the shape of one of a rectangular or rhomboidal shape.

5. The method of claim 1, wherein the carrier layer is cut by the cutting step only partially at some locations.

6. The method of claim 5, wherein the cut into the carrier layer extends not less than one half of the entire thickness dimension of the carrier layer.

7. The method of claim 6, wherein the cut extends through the thickness dimension of the entire carrier layer and through the entire thickness dimension of the carrier layer.

8. The method of claim 7, wherein the cut extends through the entire thickness dimension of the carrier layer into the foam layer.

9. The method of claim 8, Wherein the cut extends through the thickness dimension of the carrier layer and the foam layer into the decorative layer.

\* \* \* \* \*